United States Patent
Maekawa et al.

(10) Patent No.: US 6,632,771 B1
(45) Date of Patent: Oct. 14, 2003

(54) SILICA GEL CARRYING TITANIUM OXIDE PHOTOCATALYST

(75) Inventors: Masaaki Maekawa, Toyokawa (JP); Chisako Shirai, Toyokawa (JP); Satoshi Takeuchi, Toyokawa (JP); Zenichi Yamada, Toyokawa (JP)

(73) Assignee: Sintokogio Ltd., Aichi-ken (JP)

( * ) Notice: Subject to any disclaimer, the term of this patent is extended or adjusted under 35 U.S.C. 154(b) by 0 days.

(21) Appl. No.: 09/890,121

(22) PCT Filed: Feb. 2, 2000

(86) PCT No.: PCT/JP00/00561

§ 371 (c)(1),
(2), (4) Date: Jul. 27, 2001

(87) PCT Pub. No.: WO00/46148

PCT Pub. Date: Aug. 10, 2000

(30) Foreign Application Priority Data

Feb. 2, 1999 (JP) .............................................. 11-24486

(51) Int. Cl.[7] .................................................. B01J 21/08
(52) U.S. Cl. ........................................ 502/239; 502/242
(58) Field of Search ................................ 502/239, 242, 502/350

(56) References Cited

U.S. PATENT DOCUMENTS 5,981,425 A * 11/1999 Taoda et al. ................. 502/208
6,221,259 B1 * 4/2001 Kittrell ........................ 210/748

FOREIGN PATENT DOCUMENTS

JP        03-296435        12/1991

* cited by examiner

Primary Examiner—Stanley S. Silverman
(74) Attorney, Agent, or Firm—Finnegan, Henderson, Farabow, Garrett & Dunner LLP

(57) ABSTRACT

The silica gel carrying a titanium oxide photocatalyst in a high concentration of the present invention is characterized in that the concentration of the titanium oxide contained in the pores near the surface of the silica gel is 7–70% by weight, said silica gel having an average pore diameter of 6–100 nm, provided that the concentration gradient is provided such that the amount of the titanium oxide contained in the pores near the surface of the silica gel is 1.5 times or more than the amount of the titanium oxide contained in the pores near the central part of the silica gel.

2 Claims, No Drawings

SILICA GEL CARRYING TITANIUM OXIDE PHOTOCATALYST

FIELD OF THE INVENTION

This invention relates to silica gel carrying a titanium oxide photocatalyst in a high concentration that is capable of deodorizing automobiles, rooms, and stockbreeding pens or detoxifying toxic pollutants, of removing NOx in the atmosphere, decolorizing waste water caused by dyeing, preventing the emergence of algae in water tanks, and sterilizing water and air, in which the titanium oxide is contained in a high concentration in the pores of the silica gel, which has an adsorption performance, and relates to a method for preparation thereof.

BACKGROUND OF THE INVENTION

It has been well known that for a photocatalytic reaction of a semiconductor, when powders of a semiconductor are dispersed in a water solution to which a light having the same amount or more of energy as that of the band gap of the semiconductor (light having a wavelength of 400 nm or less) is made to irradiate, electrons and electron holes generated by optical pumping are transferred onto the surface of semiconductor particles and act on an ionic species and a molecular species in the water solution to cause various reactions, such as the decomposition of water. Titanium oxide is exemplified as a representative photocatalyst.

By irradiating a semiconductor by light such as sunlight, or the light of a fluorescent tube, incandescent lamp, black light, lamp, metal-halide lamp, or a cold cathode fluorescent tube, the decomposition and removal of environmental pollutants can be conducted, such as the decomposition and removal of smelly and toxic substances in the air, the treatment of waste water, a water-purifying treatment, or the sterilization of microorganisms in water.

Due to the difficulty of handling fine powders for those uses, suggested in Japanese Patent Early-publication No. 6-65012 is a titanium oxide film photocatalyst that is excellent in water-resistant and heat-resistant properties and in durability. It is obtained by producing a sol of titanium oxide from an alkoxide of titanium, coating the sol on a glass substrate by dip coating, drying and calcining the sol-coated glass substrate to form a transparent titanium oxide film photocatalyst, or by further coating a metal on the photocatalyst by photo-electrodeposition, etc. However, it has in its use big problems, such as that this catalyst can be applied only to an inorganic substance, the shape of which is limited, such as glass, ceramics, etc., and also that since a decomposition reaction by a photocatalyst is caused only on the surface of the photocatalyst, to continuously decompose and remove environmental pollutants a very large area must be provided for the photocatalyst.

DISCLOSURE OF THE INVENTION

Considering these problems, the present invention has been achieved. This invention provides silica gel carrying a photocatalyst in a high concentration and a method for preparation thereof. The silica gel of this invention has an improved performance in decomposing environmental pollutants such as smelly or toxic substances in the air, or organic solvents, agricultural chemicals, etc., contained in water, by providing a concentration gradient of titanium oxide such that the concentration near the surface of the silica gel is high and the concentration of the central part is low, said silica gel also having excellent properties of safety, economic efficiency, stability, and water-resistance (even if it is put into water it does not break apart).

This invention provides silica gel carrying a titanium oxide photocatalyst in a high concentration characterized in that, to achieve the above objects, the amount of the titanium oxide contained in the pores near the surface of the silica gel is 7–70% by weight, provided that a concentration gradient is provided such that the amount is 1.5 times or more than the amount of the titanium oxide contained in the pores near the center of the silica gel, said silica gel having an average pore diameter of 6–100 nm. This invention also provides a method for the preparation of silica gel carrying a titanium oxide photocatalyst in a high concentration characterized by mixing silica gel with a titanium-containing solution in the same volume as or less than the total pore volume of the silica gel, to have the silica gel contain the titanium-containing solution, followed by heating and calcining, said silica gel having an average pore diameter of 6–100 nm.

The silica gels used in the present invention are amorphous silicon dioxides having an average pore diameter of 6–100 nm, said silica gel not breaking apart even if it is immersed in water or an organic solvent. They can be obtained by a known method such as is described in Japanese Patent Publication No. 7-64543, etc. In this method a silica hydrogel obtained by neutralizing an alkaline silicate water-solution is dried at 100–1,000° C. by superheated steam to result in a silica xerogel, to adjust the sizes of the colloidal particles that constitute the silica gel, or by obtaining Q-6, Q-10, Q-15, Q-30, or Q-50, which are commercially available as series of CARiACT Q (produced by Fuji-Silysia Chemical Ltd.). Those silica gels greatly differ from silica gel generally used as a desiccant for packaging (an A-type or B-type standardized product under JIS Z 0701, desiccant for packaging). Since they have good mechanical strength, adsorption performance, and the property of not breaking apart even if they are immersed in water or an organic solvent, they are also used for chromatography or catalytic supports. They are applicable in various forms, from fine powders to granules. The desiccant as described above that is used for packaging has a critical defect in that when it is immersed in water or an organic solvent it crumbles. Thus it cannot be used for the present invention.

In the present invention, when the average pore diameter of the silica gel used is less than 6 nm the titanium-containing solution clogs the pores near the surface of the silica gel and thus the solution does not sufficiently impregnate the internal parts. Also, when silica gel has an average pore diameter of more than 100 nm, it is difficult to produce it and it is very expensive, and thus it is undesirable.

The crystalline structure of the titanium oxide to be contained in the pores of the silica gel of the present invention is desirably anatase, which has a high photocatalytic activity.

The silica gel carrying a titanium oxide photocatalyst in a high concentration of the present invention is one in which the amount of titanium oxide contained in pores near the surface of silica gel is 7–70% by weight, and a concentration gradient is provided such that the amount is 1.5 times or more than the amount of the titanium oxide contained in the pores near the center of the silica gel. The photocatalytic reaction of the titanium oxide occurs with an ultaviolet light having a wavelength of 400 nm or less. For an ultraviolet light having a wavelength of 380 nm, about 60% of the light is absorbed in a titanium oxide film having a thickness of 1

μm, and the titanium oxide that is involved with the photocatalytic reaction is the only one present near the surface of the silica gel. Since a titanium-containing solution is very expensive, the silica gel carrying a titanium oxide photocatalyst in a high concentration of the present invention is economically very excellent. The silica gel of this invention contains titanium oxide in a high concentration in the pores near its surface, while the titanium oxide is contained in a lower concentration or none at all in the pores of the inner part, where ultraviolet light does not reach and thus no photocatalytic reaction occurs. The titanium oxide content contained in the pores near the surface of the silica gel can be determined by EPMA, which can measure to a depth of 1–2 μm from the surface of the silica gel. The titanium oxide content contained in the pores near the center of the silica gel can be determined by EPMA by measuring the cross section obtained by cracking the silica gel.

The titanium oxide-containing solution used in the present invention may be, but is not limited to, organic titanium-containing solutions such as tetraisopropyl titanate, tetrabutyl titanate, butyl titanate dimer, tetrakis(2-ethylhexyloxy)titanium, tetrastearyl titanate, triethanolamine titanate, alkoxides of titanium such as diisopropoxybis(acetylacetonato)titanium, dibutoxy-bis(triethanolaminato)titanium, titanium ethylacetoacetate, titanium isopropoxyoctylene glycolate, titanium lactate, and titanate-based coupling agents such as isopropyltriisostearoyl titanate, isopropyltridodecylbenzenesulfonyl titanate, isopropyltris(dioctylpyrophosphate)titanate, tetraisopropylbis(dioctylphosphite)titanate, tetraoctylbis(ditridecylphosphite)titanate tetra(2,2-dialyloxymethyl-1-butyl)bis(ditridecyl)phosphite titanate, bis(dioctylpyrophosphate)oxyacetate titanate, bis(dioctylpyrophosphate)ethylene titanate, isopropyltri(dioctylphophate)titanate, isopropyltricumylphenyl titanate, and isopropyltri(N-amidoethyl-aminoethyl)titanate, and inorganic titanium-containing solutions such as titanium sulfate, titanium chloride, and titanium bromide.

Also, the above titanium-containing solution can be used alone or as a mixture of two or more of them, without limitation. It may be diluted with a solvent that is compatible therewith to adjust its concentration. As a diluent, any one that is compatible with the titanium-containing solution, such as ethanol, 1-propanol, 2-propanol, n-hexane, benzene, toluene, xylene, trichlene, propylene dichloride, and water can be used alone or as a mixture of two or more of them, without limitation.

The silica gel carrying a titanium oxide photocatalyst in a high concentration of the present invention may be obtained by adding to, e.g., a cylindrical vessel provided with a cap, the silica gel having an average pore diameter in a range of 6–100 nm as stated above and a titanium-containing solution in the same volume as or less than the total pore volume of the silica gel, rotating, vibrating, or shaking the vessel to cause the silica gel to contain a titanium-containing solution, and heating and calcining the resulting silica gel. Usually when this procedure is conducted once, a sufficient amount of titanium oxide being carried can be obtained. However, when the same procedure is conducted plural times, the amount being carried can be further increased.

When a titanium-containing solution is made to be contained in the silica gel, it is not preferable to use a conventional method such as the impregnating method, which has been generally used. This is because a titanium-containing solution in an amount greater than the total pore volume that the silica gel has is used, and thereby an excess titanium-containing solution covers the surface of silica gel, which is then calcined by heating to form a titanium oxide film that has a very small specific surface and that tends to peel. Even if a titanium-containing solution is used in an amount greater than the total pore volume of the silica gel, if an excess amount of the titanium-containing solution that covers the surface of the silica gel is removed by washing it with a diluting liquid etc., a titanium oxide film on the surface of the silica gel is not formed when heating and calcining the silica gel, and thus the above problem is overcome. However, this method is not preferable because a large amount of waste liquid caused by washing it results, and a very expensive titanium-containing solution is wasted.

To obtain a titanium oxide having a high performance as a photocatalyst, the crystalline form of which is anatase, the calcination by heating the silica gel containing a titanium-containing solution of the present invention is conducted by heating it by gradually raising the temperature of it from room temperature, maintaining the final temperature of 400–700° C. for a certain period, followed by cooling it to room temperature. If the calcination temperature is lower than 400° C., or higher than 700° C., a titanium oxide results in which the rutile or amorphous form is mixed. Thus such a temperature is not preferable.

As the furnace to be used for calcination, a gas furnace that provides oxygen sufficient for the calcination is desirable. However, an electric furnace in which insufficient oxygen is provided can also be used for the calcination, without causing a problem if more oxygen is added. When the procedure of carrying titanium oxide and calcination is conducted twice, more titanium oxide can be carried.

When a titanium-containing solution in a volume less than the total pore volume of the silica gel is made to be contained in the silica gel, the solution slowly infiltrates from the surface of the silica gel into the center of it, to form hollow spheres remaining as cavities in the center of the silica gel. Heating and calcining the thus-obtained silica gel gives the silica gel carrying a titanium oxide photocatalyst in a high concentration of the present invention, with only the surface parts of it containing titanium oxide. Also, even if a titanium oxide solution is made to be contained in the same volume as the total pore volume of the silica gel, if the concentration of a diluting liquid contained in the titanium-containing solution is 5–75% by weight and if the diluting liquid has a low molecular weight, due to the filtering function of the pores of the silica gel the silica gel that is provided with a gradient in the concentration of titanium oxide in it is obtained such that the nearer the surface part of the silica gel, the higher the concentration is, and the nearer the central part of it, the lower the concentration is. The thus-obtained silica gel is heated and calcined to result in silica gel of the present invention carrying a titanium oxide photocatalyst in a high concentration provided with a gradient such that the nearer the surface part of the silica gel, the higher the concentration of titanium oxide is, and the nearer the central part of it, the lower the concentration of titanium oxide is.

When a titanium-containing solution that is readily hydrolyzable is used, the degree of the hydrolyzation of the solution is higher for silica gel having a smaller average pore diameter. However, titanium more promptly reacts with the silanol groups present on the surface of the silica gel. Thus the solution is contained on the surface part in a higher concentration. The thus-obtained silica gel of the present invention is calcined to result in silica gel carrying a titanium oxide photocatalyst in a high concentration of the present invention, said silica gel being provided with a gradient in the concentration of titanium oxide such that the nearer the surface part of the silica gel, the higher the concentration is, and the nearer the central part, the lower the concentration is.

Although the period for mixing the silica gel and a titanium oxide-containing solution varies based on the kind of titanium oxide-containing solution to be used, it is one minute or more. It is preferable that it be 30–60 minutes, because titanium can be contained in the silica gel that is provided with a more uniform concentration gradient.

Also, when by a known method at least one kind of substance selected from the transition elements of atomic numbers 21 (Sc) to 29 (Cu), 39 (Y) to 47 (Ag), 57 (La) to 79 (Au), and 89 (Ac) to 103 (Lr), and an oxide thereof is made to co-exist with the titanium oxide photocatalyst in the pores of the silica gel carrying the photocatalyst of the present invention, the photocatalyst activity may increase. Although the reason therefor is unclear, a reaction is known as Fenton's reaction, and is such that when light is applied to titanium oxide, the resulting hydrogen peroxide, which is one kind of active oxygen, is reacted with a divalent. ferrous ion to produce a hydroxide radical. Thus it is believed that a mechanism similar to this operates with the transition elements other than iron.

The silica gel of the present invention, carrying a titanium oxide photocatalyst in a high concentration, can adsorb odors and toxic substances in the air, and organic solvents and agricultural chemicals in water in a larger amount, by containing titanium oxide in the pores of the silica gel, said pores having a larger specific surface, the silica gel being provided with a gradient in the concentration of titanium oxide. By irradiating on it light such as sunlight, or the light of a fluorescent tube, an incandescent lamp, black light, an ultraviolet lamp, mercury-arc lamp, xenon lamp, tungsten-halogen lamp, metal-halide lamp, or a cold cathode fluorescent tube, it can decompose toxic substances, etc. more efficiently than can the silica gel of any conventional invention in which a titanium oxide film photocatalyst is fixed only on the surface of silica gel.

Also, since in the present invention silica gel carrying a titanium oxide photocatalyst not only in a particle form, but also in a powder form, is obtained, on the surface of which little titanium oxide is present, it can be incorporated in plastics, paints and varnishes, paper, etc., which are decomposable with titanium oxide, to make them have functions such as an antibacterial action, and functions for the deodorization and decomposition of dirt.

The present invention will be explained in detail by the following Examples.

EXAMPLE 1

An Example in Which an Organic Titanium-containing Solution That is Hardly Hydrolyzable was Used 250 g of silica gel (an average pore diameter of 10 nm; a pore volume of 1.0 ml; a specific surface of 300 $m^2$/g) remaining on an 8 mesh-sieve after sieving, i.e., having a particle diameter of 2.38 mm or more, and dried at 200° C., and 150 g of diisopropoxy-bis(acetylacetonato)titanium (the content in terms of titanium oxide was 16.5% by weight), said amount being 60% of the total pore volume of the silica gel, was placed in a polyethylene vessel. The vessel was promptly capped and was placed on a pot mill pedestal. The pedestal was rotated at 20 rpm for 1 hour. After that the obtained silica gel was heated by gradually raising the temperature from room temperature to 600° C. using an electric furnace while sometimes the furnace cap was opened and oxygen was provided, and the temperature was maintained at 600° C. for 1 hour. Then the thus-obtained silica gel was naturally cooled to room temperature, to result in the silica gel of the present invention carrying a titanium oxide photocatalyst in a high concentration.

The thus-obtained silica gel carrying a titanium oxide photocatalyst in a high concentration was examined by X-ray diffraction. As a result, the crystalline structure of the titanium oxide was found to be 100% anatase. When the titanium oxide concentration on the surface of the silica gel was determined by EPMA, it was found to be 39% by weight. When the titanium oxide concentration on the central part of the cross section of the silica gel was determined, it was found to be about 0% by weight. Also, the content of titanium oxide determined from a measured value of the true specific gravity of the obtained silica gel carrying a titanium oxide photocatalyst in a high concentration was 11.1% by weight (based on the dried weight at 200° C.).

A test for decoloring colored water created by dyeing was conducted using this silica gel carrying a titanium oxide photocatalyst in a high concentration. First, 1.25 g of the silica gel carrying a titanium oxide photocatalyst in a high concentration and 1.25 g of only silica gel as the control were each placed in a separate quartz cell for a spectrophotometer (external size: 12.5 mm square ×45 mm height). To each of them, 4 ml of previously prepared colored water created by dyeing (water that contained methylene blue in an amount of 100 ppm) was added, and then light by a black light (15 W) was made to irradiate from a place that was 10 mm away from the cell, and the result was that the cell in which the silica gel carrying a titanium oxide photocatalyst in a high concentration was placed turned almost transparent after 60 minutes, while the cell for the control still remained its original blue. From this result it was recognized that the silica gel of the present invention carrying a titanium oxide photocatalyst in a high concentration had a significant performance on decomposing colored water.

EXAMPLE 2

An Example in Which an Organic Titanium-containing Solution That is Readily Hydrolyzable was Used 250 g of silica gel (an average pore diameter of 10 nm; a pore volume of 1.0 ml; a specific surface of 300 $m^2$/g) remaining on an 8 mesh-sieve after sieving, i.e., having a particle diameter of 2.38 mm or more, and dried at 200° C. , and 250 g of titanium tetraisopropoxide (the content in terms of titanium oxide was 28.2% by weight), said amount being 100% of the total pore volume of the silica gel, were placed in a polyethylene vessel. The vessel was promptly capped and was placed on a pot mill pedestal. Then the pedestal was rotated at 20 rpm for 1 hour. After that the obtained silica gel was heated by gradually raising the temperature from room temperature to 600° C. using an electric furnace while sometimes the furnace cap was opened and oxygen was provided, and the temperature was maintained at 600° C. for 1 hour. Then the thus-obtained silica gel was naturally cooled to room temperature, to result in silica gel of the present invention carrying a titanium oxide photocatalyst in a high concentration.

The thus-obtained silica gel carrying a titanium oxide photocatalyst in a high concentration was examined by X-ray diffraction. As a result, the crystalline structure of the titanium oxide was found to be 100% anatase. When the titanium oxide concentration on the surface of the silica gel was determined by EPMA, it was found to be 45% by weight. When the titanium oxide concentration on the central part of the cross section of the silica gel was determined, it was found to be 18% by weight. Also, the content of titanium oxide determined from a measured value of the true specific gravity of the obtained silica gel carrying a titanium oxide photocatalyst in a high concentration was 25.3% by weight (based on the dried weight at 200° C.).

A test for decoloring colored water caused by dyeing was conducted using this silica gel carrying a titanium oxide photocatalyst in a high concentration. First, 1.25 g of the silica gel carrying a titanium oxide photocatalyst in a high concentration and 1.25 g of only silica gel as the control were each placed in a separate quartz cell for a spectrophotometer (external size: 12.5 mm square×45 mm height). To both of them, 4 ml of previously prepared colored water created by dyeing (water that contains methylene blue in an amount of 100 ppm) was added. Then light by a black light (15 W) was made to irradiate from a place that was 10 mm away from the cell, and the result was that the cell in which the silica gel carrying a titanium oxide photocatalyst in a high concentration was placed turned almost transparent after 60 minutes, while the control cell still remained its original blue. From this result it was recognized that the silica gel carrying a titanium oxide photocatalyst in a high concentration of the present invention had a significant performance in decomposing the colored water.

EXAMPLE 3

An Example in Which an Inorganic Titanium-containing Solution was Used 250 g of silica gel (an average pore diameter of 10 nm; a pore volume of 1.0 ml; a specific surface of 300 m²/g) remaining on an 8 mesh-sieve after sieving, i.e., having a particle diameter of 2.38 mm or more, and dried at 200° C., and 180 g of a 20% water solution of titanium trichloride (the content in terms of the titanium oxide was 10.3% by weight), said amount being 60% of the total pore volume of the silica gel, were placed in a polyethylene vessel. The vessel was promptly capped and was placed on a pot mill pedestal. Then the pedestal was rotated at 20 rpm for 1 hour. After that the obtained silica gel was heated by gradually raising the temperature from room temperature to 600° C., using an electric furnace, while sometimes the furnace cap was opened and oxygen was provided, and the temperature was maintained at 600° C. for 1 hour. Then the thus-obtained silica gel was naturally cooled to room temperature to result in the silica gel carrying a titanium oxide photocatalyst in a high concentration of the present invention.

The thus-obtained silica gel carrying a titanium oxide photocatalyst in a high concentration was examined by X-ray diffraction. As a result, the crystalline structure of the titanium oxide was found to be 100% anatase. When the titanium oxide concentration on the surface of the silica gel was determined by EPMA, it was found to be 35% by weight. When the titanium oxide concentration on the central part of the cross section of the silica gel was determined, it was found to be about 0% by weight. Also, the content of titanium oxide determined from a measured value of the true specific gravity of the obtained silica gel carrying a titanium oxide photocatalyst in a high concentration was 8.3% by weight (based on the dried weight at 200° C.).

A test for decoloring colored water created by dyeing was conducted using this silica gel carrying a titanium oxide photocatalyst in a high concentration. First, 1.25 g of the silica gel carrying a titanium oxide photocatalyst in a high concentration and 1.25 g of only silica gel as the control were each placed in a separate quartz cell for a spectrophotometer (external size: 12.5 mm square×45 mm height). To each of them, 4 ml of previously prepared colored water created by dyeing (water that contains methylene blue in an amount of 100 ppm) was added. Then light by a black light (15 W) was made to irradiate from a place that was 10 mm away from the cell, and the result was that in the cell in which the silica gel carrying a titanium oxide photocatalyst in a high concentration was placed turned almost transparent after 60 minutes, while the cell for the control still remained its original blue. From this result it was recognized that the silica gel carrying a titanium oxide photocatalyst in a high concentration of the present invention had a significant performance in decomposing the colored water.

Comparative Example 1

An Example in Which the Same Kind of Silica Gel as in the Above Examples was used Except That it had a Smaller Average Sore Diameter 250 g of silica gel (an average pore diameter of 3 nm; a pore volume of 0.3 ml; a specific surface of 550 m²/g) remaining on an 8 mesh-sieve after sieving, i.e., having a particle diameter of 2.38 mm or more, and dried at 200° C. , and 75 g of diisopropoxy bis(acetylacetonato)titanium (the content in terms of titanium oxide was 16.5% by weight ), said amount being 100% of the total pore volume of the silica gel, were placed in a polyethylene vessel. The vessel was promptly capped and was placed on a pot mill pedestal. The pedestal was rotated at 20 rpm for 1 hour. After that the obtained silica gel was heated by gradually raising the temperature from room temperature to 600° C. using an electric furnace while sometimes the furnace cap was opened and oxygen was provided, and the temperature was maintained at 600° C. for 1 hour. Then the thus-obtained silica gel was naturally cooled to room temperature to result in the silica gel carrying a photocatalyst.

The thus-obtained silica gel carrying a photocatalyst was examined by X-ray diffraction. However, no crystalline structure of the titanium oxide could be determined because of the small amount of titanium oxide carried. When the titanium oxide concentration on the surface of the silica gel was determined by EPMA, it was found to be 1.2% by weight. When the titanium oxide concentration on the central part of the cross section of the silica gel was determined, it was found to be about 0% by weight. Also, the content of titanium oxide determined from a measured value of the true specific gravity of the obtained silica gel carrying a photocatalyst was 0.3% by weight (based on the dried weight at 200° C.).

A test for decoloring colored water created by dyeing was conducted using this silica gel carrying a photocatalyst. First, 1.25 g of the silica gel carrying a photocatalyst and 1.25 g of only silica gel as the control were each placed in a separate quartz cell for a spectrophotometer (external size: 12.5 mm square×45 mm height). To each of them, 4 ml of previously prepared colored water created by dyeing (water that contains methylene blue in an amount of 100 ppm) was added, and then light by a black light (15 W) was made to irradiate from a place that was 10 mm away from the cell, and the result was that the cell in which the silica gel carrying a photocatalyst was placed remained blue 360 minutes later. From this result it was recognized that the silica gel carrying a photocatalyst had little performance in decomposing colored water.

Comparative Example 2

An Example in Which a Different Kind of Silica Gel (An A-Type Standardized Product Under JIS Z 0701, Desiccant Used for Packaging) was Used In the same manner as in Example 2, 250 g of A-type silica gel (an average pore diameter of 2.4 nm; a pore volume of 0.46 ml; a specific surface of 700 m²/g) remaining on an 8 mesh-sieve after sieving, i.e., having a particle diameter of 2.38 mm or more, and dried at 200° C., and 115 g of diisopropoxybis(acetylacetonato)titanium (the content in terms of titanium oxide was 16.5% by weight ), said amount being 100% of the total pore volume, were placed in a polyethylene vessel. The vessel was promptly capped and was placed on a pot mill pedestal. When the pedestal was rotated at 20 rpm for 1 hour, it was found that the silica gel had broken into pieces. It was recognized as being incapable of being used.

EXAMPLE 4

An Example in Which a Titanium Coupling-agent was Used 250 g of silica gel (an average pore diameter of 10 nm; a pore volume of 1.0 ml; a specific surface of 300 m²/g) remaining on an 8 mesh-sieve after sieving, i.e., having a particle diameter of 2.38 mm or more, and dried at 200° C., and 150 g of isopropyltriisostearoyl titanate (the content in terms of titanium oxide was 8.2% by weight), said amount being 60% of the total pore volume of the silica gel, were placed in a polyethylene vessel. The vessel was promptly capped and was placed on a pot mill pedestal. Then the pedestal was rotated at 20 rpm for 1 hour. After that the obtained silica gel was heated by gradually raising the temperature from room temperature to 600° C. using an electric furnace while sometimes the furnace cap was opened and oxygen was provided, and the temperature was maintained at 600° C. for 1 hour. Then the thus-obtained silica gel was naturally cooled to room temperature to result in the silica gel carrying a titanium oxide photocatalyst in a high concentration of the present invention.

The thus-obtained silica gel carrying a titanium oxide photocatalyst in a high concentration was examined by X-ray diffraction. As a result, the crystalline structure of the titanium oxide was found to be 100% anatase. When the titanium oxide concentration on the surface of the silica gel was determined by EPMA it was found to be 32% by weight. When the titanium oxide concentration on the central part of the cross section of the silica gel was determined, it was found to be about 0% by weight. Also, the content of titanium oxide determined from a measured value of the true specific gravity of the obtained silica gel carrying a titanium oxide photocatalyst in a high concentration was 4.7% by weight (based on the dried weight at 200° C.).

A test for decoloring colored water created by dyeing was conducted using this silica gel carrying a titanium oxide photocatalyst in a high concentration. First, 1.25 g of the silica gel carrying a titanium oxide photocatalyst in a high concentration and 1.25 g of only silica gel as the control were each placed in a separate quartz cell for a spectrophotometer (external size: 12.5 mm square×45 mm height). To each of them, 4 ml of previously prepared colored water created by dyeing (water that contains methylene blue in an amount of 100 ppm) was added. Then light by a black light (15 W) was made to irradiate from a place that was 10 mm away from the cell, and the result was that the cell in which the silica gel carrying a titanium oxide photocatalyst in a high concentration was placed turned almost transparent 60 minutes later, while resulting in the cell for the control still remaining its original blue. From this result it was recognized that the silica gel carrying a titanium oxide photocatalyst in a high concentration of the present invention had a significant performance in decomposing colored water.

EXAMPLE 5

An Example in Which Silica Gel in a Powdery Form was Used 250 g of silica gel (an average pore diameter of 6 nm; a pore volume of 1.1 ml; a specific surface of 450 m²/g) having an average particle diameter of 40 μm and dried at 200° C. and 165 g of diisopropoxy-bis(acetylacetanato) titanium (the content in terms of titanium oxide was 16.5% by weight), said amount being 60% of the total pore volume of the silica gel, were placed in a polyethylene vessel. The vessel was promptly capped and was placed on a pot mill pedestal. Then the pedestal was rotated at 20 rpm for 1 hour. After that the obtained silica gel was heated by gradually raising the temperature from room temperature to 600° C. using an electric furnace while sometimes the furnace cap was opened and oxygen was provided, and the temperature was maintained at 600° C. for 1 hour. Then the thus-obtained silica gel was naturally cooled to room temperature to result in the silica gel carrying a photocatalyst in a high concentration of the present invention.

The thus-obtained silica gel carrying a photocatalyst in a high concentration was examined by X-ray diffraction. As a result, the crystalline structure of the titanium oxide was found to be 100% anatase. When the titanium oxide concentration on the surface of the silica gel was determined by EPMA, it was found to be 41% by weight. When the titanium oxide concentration on the central part of the cross section of the silica gel was determined, it was found to be about 0% by weight. Also, the content of titanium oxide determined from a measured value of the true specific gravity of the obtained silica gel carrying a photocatalyst in a high concentration was 12.3% by weight (based on the dried weight at 200° C.).

A test for decoloring colored water created by dyeing was conducted using this silica gel carrying a photocatalyst in a high concentration. First, 1.25 g of the silica gel carrying a photocatalyst in a high concentration and 1.25 g of only silica gel as the control were each placed in a separate quartz cell for a spectrophotometer (external size: 12.5 mm square× 45 mm height). To each of them, 4 ml of previously prepared colored water created by dyeing (water that contains methylene blue in an amount of 100 ppm) was added. Then light by a black light (15 W) was made to irradiate from a place that was 10 mm away from the cell. This resulted in the cell in which the silica gel carrying a titanium oxide photocatalyst in a high concentration was placed turning almost transparent 60 minutes later, while the cell for the control still remained its original blue. From this result it was recognized that the silica gel carrying a photocatalyst in a high concentration of the present invention had a significant performance in decomposing colored water.

Comparative Example 3

An Example in Which Silica Gel in a Powdery Form and the Conventional Impregnation Method Were Used To a beaker in which 50 g of diisopropoxy-bis (acetylacetonato)titanium (the content in terms of titanium oxide was 16.5% by weight ) was placed, 10 g of silica gel (an average pore diameter of 6 nm; pore volume of 1.1 ml; specific surface of 450 m²/g) having an average particle diameter of 40μm and dried at 200° C. was added. After the thus-obtained mixture was gently stirred, it was allowed to stand for 30 minutes. Since no solid-liquid separation can be conducted by using a sieve, it was done by centrifugal separation. However, the resulting silica gel contained a solution. After that the silica gel was heated by gradually raising the temperature from room temperature to 600° C. using an electric furnace while sometimes the furnace cap was opened and oxygen was provided, and the temperature was maintained at 600° C. for 1 hour. Then the thus-obtained silica gel was naturally cooled to room temperature, to result in the silica gel carrying a photocatalyst.

Since the resulting silica gel was solidified, it was loosened manually for observation by SEM. Ultrafine particles of titanium oxide that were not originally present were observed in a large amount. It was recognized that the silica gel obtained did not differ from a mere mixture of silica gel powders and ultrafine titanium oxide particles.

EXAMPLE 6

NOx were decomposed and removed by using the silica gel carrying a photocatalyst in a high concentration that was obtained as in Example 1. First, in a sealed vessel having an internal volume of 40 l (a 20-W black light was built in), 1 kg of the obtained silica gel carrying a photocatalyst in a high concentration was placed. After 10 ppm of NOx was injected by a syringe in the sealed vessel, the light was turned on. After 15 minutes, the concentration of NOx contained in the air in the vessel was determined by a gas chromatograph and found to be 0 ppm. Then after the lowered amount of NOx was injected in the vessel by a syringe, the black light was again turned on. After 15 minutes, the concentration of NOx contained in the air in the vessel was determined by a gas chromatograph and was found to be 0 ppm. The same determination was repeated 10 times. Every time, the concentration of NOx contained in the air in the vessel that was determined 15 minutes after the light was turned on was 0 ppm. From this result it was recognized that the silica gel carrying a photocatalyst in a high concentration of the present invention had a significant effect on decomposing and removing NOx.

Next, a similar test was conducted in a sealed vessel using an active carbon honeycomb (1 kg weight) instead of the silica gel carrying a photocatalyst in a high concentration. As a result, it was found that although the NOx concentration determined for the first time was about 0 ppm, it gradually increased as the number of times increased. For the sixth time, it was about 10 ppm. This means that no decomposition or removal effect was found at all.

EXAMPLE 7

A smelly substance was decomposed and removed by using the silica gel carrying a titanium oxide in a high concentration that was obtained as in Example 2. First, in a sealed vessel having an internal volume of 40 l (a 20-W black light was built in), 1 kg of the obtained silica gel carrying a photocatalyst in a high concentration was placed. After 80 ppm of trimethylamine was injected by a syringe in the sealed vessel, the light was turned on. After 20 minutes, the concentration of the trimethylamine contained in the air in the vessel was determined by a gas chromatograph and was found to be 0 ppm. Then after the lowered amount of trimethylamine was injected in the vessel by a syringe, the black light was again turned on. After 20 minutes, the concentration of trimethylamine contained in the air in the vessel was determined by a gas chromatograph and found to be 0 ppm. The same determination was repeated 10 times. Every time, the concentration of the trimethylamine contained in the air in the vessel that was determined 20 minutes after the light was turned on was 0 ppm. From this result it was recognized that the silica gel carrying a photocatalyst in a high concentration of the present invention had a significant effect on decomposing and removing trimethylamine.

Next, a similar test was conducted in a sealed vessel using granular active carbon (1 kg weight) instead of the silica gel carrying a photocatalyst in a high concentration. As a result, it was found that although the trimethylamine concentration determined for the first time was 0 ppm, it gradually increased as the number of times increased. For the ninth time it was about 80 ppm, which means that no removal effect was found at all.

EXAMPLE 8

An organic solvent was decomposed and removed by using the silica gel carrying a titanium oxide in a high concentration that was obtained as in Example 4. First, in a test tube made of silica glass in which 15 ml of a water solution of 10 ppm of trichloroethylene was placed, 10 g of the silica gel carrying a photocatalyst in a high concentration was placed. After bubbling with oxygen, light of a 500-W high-pressure mercury-vapor lamp was made to irradiate. One hour after the light was made to irradiate on it, the concentration of the trichloroethylene contained in the water solution was determined by a gas chromatograph and found to be 0 ppm. Next, after a lowered amount of trichloroethylene was added, light was applied. One hour after the light was made to irradiate, the concentration of trichloroethylene contained in the water solution was determined by a gas chromatograph and found to be 0 ppm. The same determination was repeated 10 times. Every time the concentration of the trichloroethylene contained in the water solution was determined one hour after the light was made to irradiate on it, it was found to be 0 ppm. From this result it was recognized that the silica gel carrying a photocatalyst in a high concentration of the present invention had a significant effect on decomposing trichloroethylene.

Next, a similar test was conducted using a fibrous active carbon honeycomb (1 kg weight) instead of the silica gel carrying a photocatalyst in a high concentration. As a result, it was found that although the trichlorethylene concentration determined for the first time was 0 ppm, it gradually increased as the number of times increased. For the tenth time, it was about 10 ppm, which means that no decomposition effect was found at all.

EXAMPLE 9

A smelly substance was decomposed and removed by using the silica gel carrying a photocatalyst in a high concentration that was obtained as in Example 5. First, a paste was thickly applied to the entire part of one side of drawing paper. Before the paste was dried, the obtained silica gel carrying a photocatalyst in a high concentration was sprinkled on the entire surface of the paste. Then the paste was dried to obtain paper coated with silica gel carrying a photocatalyst. This paper was laid in a sealed vessel having an internal volume of 40 l (a 20-W black light was built in). After injecting 80 ppm of trimethylamine in the sealed vessel by a syringe, the black light was turned on. After one hour, the concentration of trimethylamine contained in the air in the vessel was determined by a gas chromatograph and found to be 0 ppm. Then after the lowered amount of trimethylamine was injected in the vessel by a syringe, the black light was again turned on. After one hour, the concentration of trimethylamine contained in the air in the vessel was determined by a gas chromatograph and found to be 0 ppm. The same determination was repeated 10 times. Every time the concentration of trimethylamine that was contained in the air in the vessel was determined one hour after the light was turned on, it was 0 ppm. From this result it was recognized that the silica gel carrying a photocatalyst in a high concentration of the present invention had a significant effect on decomposing and removing trimethylamine.

Next, a similar test was conducted using drawing paper coated with powdery active carbon instead of the silica gel carrying a photocatalyst in a high concentration. As a result, it was found that although the trimethylamine concentration determined for the first time was 0 ppm, it gradually increased as the number of times increased. For the fifth time it was about 80 ppm, which means that no decomposing effect was found at all.

EXAMPLE 10

A test was conducted to see if paint was decomposed when the silica gel carrying a photocatalyst in a high concentration that was obtained in Example 5 was incorporated in the paint.

1% by weight of the silica gel carrying a photocatalyst in a high concentration obtained as in Example 5 was added to a white acrylic emulsion paint (trade name: VINIDELUX; produced by Kansai Paint Co., Ltd.). The thus-obtained paint was applied to a glass plate and dried at room temperature for one week. After that the glass plate was placed 20 cm under a black light (15W). The light was made to irradiate on the silica gel for one week. No color change was observed at all. In contrast, when a similar test was conducted for a commercially available powdery titanium oxide photocatalyst (AMT-600; produced by Tayca Corporation), the color of the paint was changed to yellow. From those results, it was confirmed that the silica gel carrying a photocatalyst in a high concentration of the present invention hardly decomposes a paint even if the silica gel is mixed with the paint.

Industrial Applicability

The silica gel carrying a titanium oxide catalyst in a high concentration of the present invention, in which the titanium oxide is contained with a concentration gradient of titanium oxide in pores having a large specific-surface of the silica gel, can adsorb in a large amount smelly and toxic substances in the air, or organic solvents, agricultural chemicals, etc., contained in water. By irradiating by sunlight, or the light of a fluorescent tube, incandescent lamp, black light, ultraviolet lamp, mercury-arc lamp, xenon lamp, tungsten-halogen lamp, metal-halide lamp, or cold cathode fluorescent tube, it is better than those in which a titanium oxide film photocatalyst is fixed to only the surface of silica gel in its ability and durability to rapidly and efficiently decompose and remove them and to control the propagation of fungi, and in its performance that is excellent from the viewpoint of safety, economic efficiency, stability, and water-resistance (it does not break apart when it is put into water). Further, silica gels in various forms, such as particulate products, shattered products, and powdery products, can be used without limitation. Also, the amount of titanium oxide fixed to the surface of the silica gel can be very small. Thus when it is coated on or contained in fibers, plastics, paints, or paper, which are organic substances, it poses no problem, and has functions as a substance that decomposes and removes environmental pollutants. It also has antibacterial and deodorant functions. It can be applied to a wide range of uses such as those for controlling the propagation of fungi and for the deodorization of bathrooms, baths that are available 24 hours, water-purifying devices, air purifiers, lavatories, kitchens, and automobiles, for the treatments of waste water, cleaning pools and tanks, and preventing the emergence of algae in tanks for aquarium fish.

What is claimed is:

1. Silica gel carrying a titanium oxide photocatalyst in a high concentration characterized in that the amount of the titanium oxide contained in the pores near the surface of silica gel is 10–70% by weight, said silica gel having an average pore diameter of 6–100 nm, provided that the concentration gradient is provided such that the amount of the titanium oxide contained in the pores near the surface of the silica gel is 1.5 times or more than the amount of titanium oxide contained in the pores near the central part of the silica gel.

2. A method for preparing silica gel carrying a titanium oxide photocatalyst in a high concentration, characterized by adding to a sealed vessel silica gel having an average pore diameter in the range of 6–100 nm and a titanium-containing solution in the same volume as or less than the total pore volume of the silica gel, and mixing the silica gel and the titanium-containing solution by rotating, vibrating, or shaking the sealed vessel, to have the silica gel contain the titanium-containing solution, followed by heating and calcining.

* * * * *